US012617109B2

(12) United States Patent
Yang et al.

(10) Patent No.: US 12,617,109 B2
(45) Date of Patent: May 5, 2026

(54) RAZOR CARTRIDGE

(71) Applicant: DORCO CO., LTD., Seoul (KR)

(72) Inventors: Ji Hoon Yang, Seoul (KR); Se Jun Jang, Seoul (KR)

(73) Assignee: Dorco Co., Ltd., Seoul (KR)

( * ) Notice: Subject to any disclaimer, the term of this patent is extended or adjusted under 35 U.S.C. 154(b) by 76 days.

(21) Appl. No.: 18/659,824

(22) Filed: May 9, 2024

(65) Prior Publication Data

US 2024/0286303 A1 Aug. 29, 2024

Related U.S. Application Data

(63) Continuation of application No. PCT/KR2023/018415, filed on Nov. 16, 2023.

(30) Foreign Application Priority Data

Nov. 18, 2022 (KR) ........................ 10-2022-0155462
Nov. 3, 2023 (KR) ........................ 10-2023-0150932

(51) Int. Cl.
*B26B 21/22* (2006.01)
*B26B 21/40* (2006.01)
*B26B 21/44* (2006.01)

(52) U.S. Cl.
CPC ........ *B26B 21/222* (2013.01); *B26B 21/4018* (2013.01); *B26B 21/4031* (2013.01); *B26B 21/443* (2013.01)

(58) Field of Classification Search
CPC .............. B26B 21/222; B26B 21/4018; B26B 21/4031; B26B 21/443
See application file for complete search history.

(56) References Cited

U.S. PATENT DOCUMENTS 4,407,067 A 10/1983 Trotta
6,212,777 B1 4/2001 Gilder et al.
(Continued)

FOREIGN PATENT DOCUMENTS

EP 1 729 936 B1 11/2009
EP 3453500 A1 3/2019
(Continued)

OTHER PUBLICATIONS

International Search Report mailed Feb. 20, 2024 in International Application No. PCT/KR2023/018414.
(Continued)

*Primary Examiner* — Omar Flores Sanchez
(74) *Attorney, Agent, or Firm* — Knobbe, Martens, Olson, & Bear, LLP

(57) ABSTRACT

A razor cartridge is proposed. The razor cartridge may include at least one blade having a cutting edge and a blade housing accommodating the at least one blade in a longitudinal direction. The razor cartridge may also include a guard frame accommodating the blade housing to be movable forwards and backwards, in which the guard frame includes a first front supporter provided in front of the blade housing and coming into contact with skin during a shaving process. The blade housing may include a second front supporter provided between the blade and the first front supporter and coming into contact with skin during the shaving process. A topmost portion of the second front supporter may be higher than a topmost portion of the first front supporter.

20 Claims, 7 Drawing Sheets

(56) References Cited

U.S. PATENT DOCUMENTS

| | | | | |
|---|---|---|---|---|
| 10,967,531 | B2 | 4/2021 | Griffin et al. | |
| 11,000,960 | B1 | 5/2021 | Hooberman | |
| 11,220,014 | B2 | 1/2022 | Kim et al. | |
| 12,515,363 | B2 * | 1/2026 | Ahn | B26B 21/521 |
| 2003/0204955 | A1 | 11/2003 | Gilder et al. | |
| 2005/0198830 | A1 * | 9/2005 | Walker | B26B 21/528 30/527 |
| 2005/0278954 | A1 | 12/2005 | Orloff et al. | |
| 2012/0110857 | A1 | 5/2012 | Peterson et al. | |
| 2014/0026424 | A1 * | 1/2014 | Oglesby | B26B 21/4031 30/50 |
| 2016/0158948 | A1 | 6/2016 | Eagleton et al. | |
| 2017/0203451 | A1 * | 7/2017 | Griffin | B26B 21/565 |
| 2017/0217033 | A1 | 8/2017 | Tucker et al. | |
| 2017/0266825 | A1 | 9/2017 | Bozikis et al. | |
| 2018/0304483 | A1 | 10/2018 | Lev | |
| 2019/0270210 | A1 * | 9/2019 | Coresh | B29C 66/30321 |
| 2020/0346357 | A1 | 11/2020 | Skodras et al. | |
| 2022/0314477 | A1 * | 10/2022 | Galanis | B26B 21/4031 |
| 2023/0166417 | A1 * | 6/2023 | Lee | B26B 21/4031 30/50 |
| 2023/0166420 | A1 * | 6/2023 | Ahn | B26B 21/222 30/50 |
| 2023/0390953 | A1 * | 12/2023 | Kim | B26B 21/4018 |
| 2024/0286304 | A1 * | 8/2024 | Yang | B26B 21/20 |

FOREIGN PATENT DOCUMENTS

| | | | |
|---|---|---|---|
| JP | 2007-083084 | A | 4/2007 |
| JP | 2009-189589 | A | 8/2009 |
| KR | 10-2006-0121161 | A1 | 11/2006 |
| KR | 10-1068271 | B1 | 9/2011 |
| KR | 10-1774370 | B1 | 9/2017 |
| KR | 10-2028912 | B1 | 10/2019 |
| KR | 10-2063770 | B1 | 1/2020 |
| KR | 10-2192994 | B1 | 12/2020 |

OTHER PUBLICATIONS

Office Action in Korean Application No. 10-2023-0150931 dated Oct. 2, 2025.

Non-Final Office Action in U.S. Appl. No. 18/659,848 dated Nov. 14, 2025.

Office Action received in Korean Application No. 10-2023-0150932 dated Oct. 2, 2025.

International Search Report mailed Feb. 16, 2024 in International Application No. PCT/KR2023/018415.

Notice of Allowance in KR counterpart Application No. 10-2023-0150932 dated Feb. 13, 2026.

* cited by examiner

10

RAZOR CARTRIDGE

CROSS-REFERENCE TO RELATED APPLICATIONS

This is a continuation application of International Application No. PCT/KR2023/018415 filed on Nov. 16, 2023, which claims the benefit of Korean Patent Application Nos. 10-2022-0155462, filed on Nov. 18, 2022 and 10-2023-0150932, filed on Nov. 3, 2023 in the Korean Intellectual Property Office, the disclosure of each of which is incorporated herein by reference in its entirety.

BACKGROUND

Technical Field

The disclosure relates to a razor cartridge, and more particularly to a razor cartridge in which at least one blade is accommodated.

Description of Related Technology

In general, a razor refers to a device that is used to cut body hair such as fine hair and beard from a face or body, and includes a razor handle for gripping, and a razor cartridge with a blade for shaving while being in contact with skin.

SUMMARY

One aspect is a razor cartridge capable of linear motion, which has an improved shaving efficiency while causing less irritation to skin.

The aspects of the disclosure are not limited to the aspects disclosed herein, and other aspects not mentioned here may become apparent to those skilled in the art from the following description.

Another aspect is a razor that includes at least one blade having a cutting edge; a blade housing accommodating the at least one blade in a longitudinal direction; and a guard frame accommodating the blade housing to be movable forwards and backwards, in which the guard frame includes a first front supporter provided in front of the blade housing and coming into contact with skin during a shaving process, the blade housing includes a second front supporter provided between the blade and the first front supporter and coming into contact with skin during the shaving process, and a topmost portion of the second front supporter is higher than a topmost portion of the first front supporter.

Other details of the disclosure are included in the detailed description and the accompanying drawings.

According to the embodiments of the disclosure, the effects are at least as follows.

A shaving efficiency is improved while causing less irritation to skin.

The effects of the disclosure are not limited to those described above, and various other effects are included in the following description.

DETAILED DESCRIPTION

Figure 1:
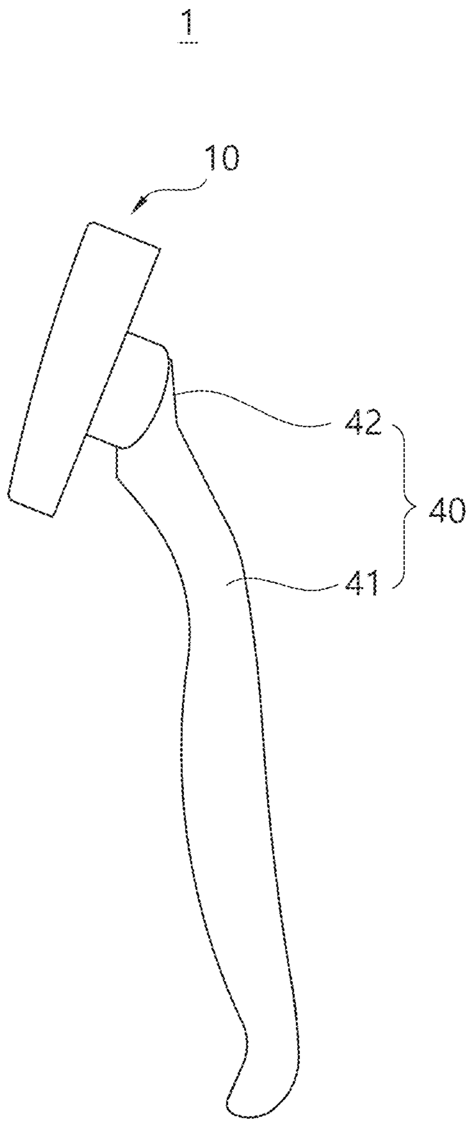
FIG. 1 is a lateral view schematically illustrating a razor assembly according to an embodiment of the disclosure.

Recently, razor technology that makes the razor cartridge move in linear motion in a shaving direction has emerged as a method of improving a hair cutting efficiency of the blade.

In such a razor, the blade is structured to alternate between forward movement in the shaving direction and backward movement in an opposite direction to the shaving direction, and the forward movement of the blade causes strong irritation to a user's skin.

The merits and characteristics of the disclosure and a method for achieving the merits and characteristics will become more apparent from embodiments described below in detail in conjunction with the accompanying drawings. However, the disclosure is not limited to the disclosed embodiments, but may be implemented in various different ways. The embodiments are provided to only complete the disclosure and to allow those skilled in the art to understand the category of the disclosure. The disclosure is defined by the category of the claims.

In addition, embodiments of the disclosure will be described with reference to cross-sectional views and/or schematic views as idealized exemplary illustrations. Therefore, the illustrations may be varied in shape depending on manufacturing techniques, tolerance, and/or etc. Further, elements in the drawings may be relatively enlarged or reduced for convenience of description. Like numerals refer to like elements throughout.

Further, first, second, i), ii), a), b) and the like terms may be used in describing elements according to embodiments of the disclosure. Such terms are used solely for the purpose of differentiating one element from another, but not limit the substances, the order, sequence, etc. of those elements. Throughout this specification, when a part 'includes' or 'comprises' an element, the part is meant to further include other elements rather than excluding other elements unless otherwise stated explicitly.

Below, a razor cartridge and a razor assembly including the same according to embodiment of the disclosure will be described with reference to the accompanying drawings.

FIG. 1 is a lateral view schematically illustrating a razor assembly according to an embodiment of the disclosure.

Referring to FIG. 1, a razor assembly 1 according to an embodiment of the disclosure includes a razor cartridge 10, and a handle 40 to which the razor cartridge 10 is coupled. According to an embodiment, the razor cartridge 10 may be detachably coupled to the razor handle 40. Further, the razor cartridge 10 according to an embodiment may be rotatable within a specific angle range with respect to the razor handle

40. Alternatively, the razor cartridge 10 according to an embodiment may be not rotatable with respect to the razor handle 40.

The razor handle 40 includes a handle body 41 and a handle head 42.

The handle body 41 refers to a part to be gripped by a user.

The handle head 42 is provided at a first end of the handle body 41, allows the razor cartridge 10 to be detachably coupled thereto, and rotatably supports the coupled razor cartridge 10. To this end, a connecting member (not shown) for connecting the razor cartridge 10 and the razor handle 40 may be provided between the razor cartridge 10 and the end of the handle head 42. The connecting member may allow the razor cartridge 10 to be detachably coupled to the razor handle 40, or may allow the razor cartridge 10 to be rotatably coupled to the razor handle 40. However, the connecting member may not provide, but not limited to, at least one of functions such as the detachable coupling and the rotatable coupling between the razor cartridge 10 and the razor handle 40.

Below, a razor cartridge according to an embodiment of the disclosure will be described.

Figure 2:
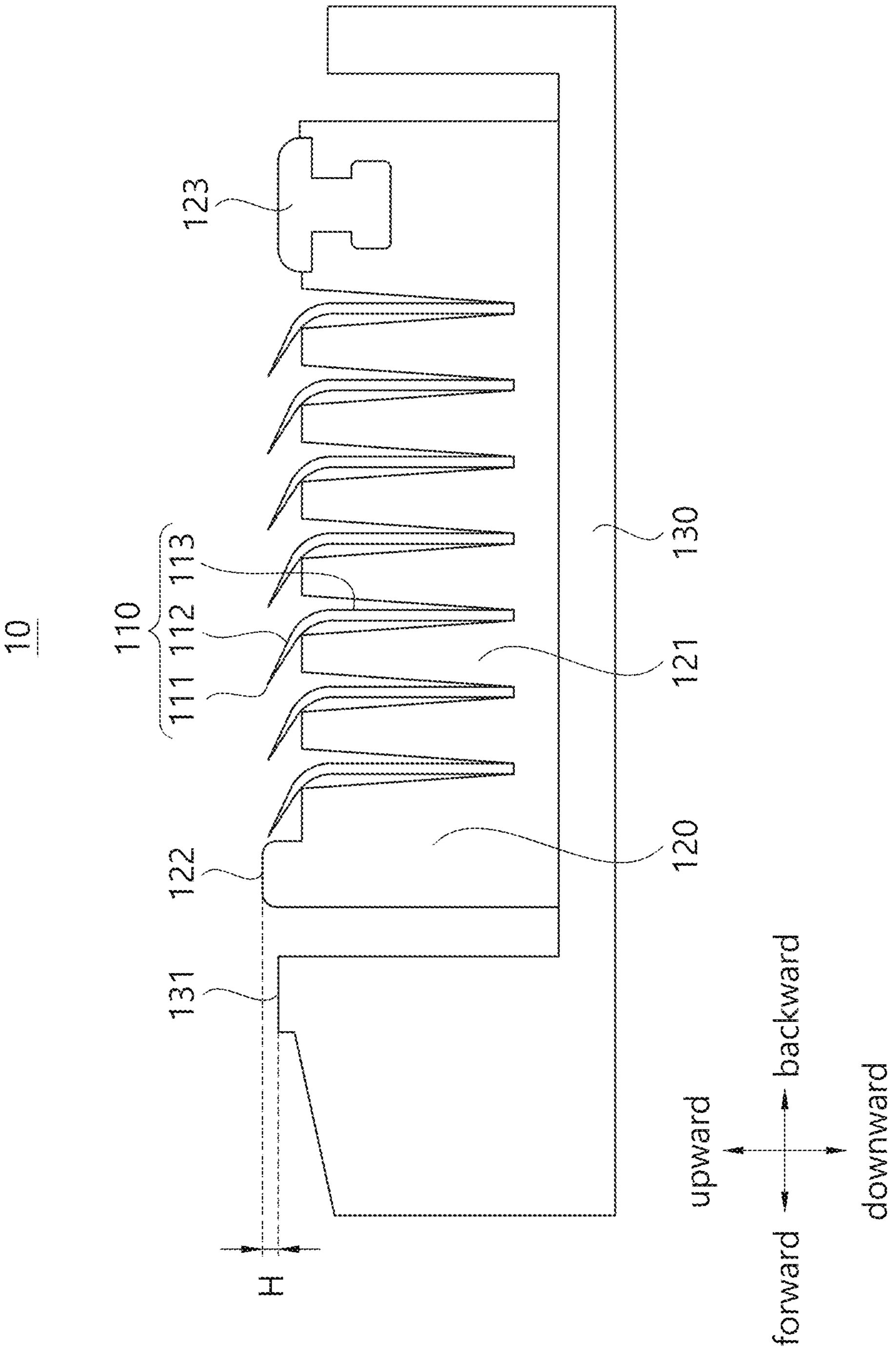
FIG. 2 is a lateral view schematically illustrating a razor cartridge according to an embodiment of the disclosure.

FIG. 2 is a lateral view schematically illustrating a razor cartridge according to an embodiment of the disclosure.

Referring to FIG. 2, the razor cartridge 10 according to an embodiment of the disclosure includes at least one blade 110, a blade housing 120, and a guard frame 130.

The blade 110 includes a cutting edge 111 for cutting body hair. The blade 110 may include at least one of a straight blade, a bending blade, and a welded blade. The bending blade is illustrated as the blade 110 in FIG. 2, etc.

The blade housing 120 is structured to accommodate at least one blade 110 in a longitudinal direction. The blades 110 may be accommodated in the blade housing 120 in a transverse direction so that the cutting edges 111 are parallel along the longitudinal direction. Referring to FIG. 2, the transverse direction corresponds to forward and backward directions.

Further, the forward direction in FIG. 2 may refer to a direction (i.e., a shaving direction) where the razor cartridge 10 moves on a user's skin during a shaving process.

Further, the top surface of the razor cartridge 10 (to be described later) refers to a surface that touches or faces a user's skin during the shaving process.

In the blade housing 120, each blade 110 may be accommodated with its cutting edge 111 facing forwards. FIG. 2, etc. show an example that seven blades 110 are accommodated in the blade housing 120, but the number of blades 110 may be varied depending on embodiments.

Below, for convenience of description, it will be described by way of example that the seven blades 110 are included, and the seven blades 110 will be called a first blade, a second blade, a third blade, a fourth blade, a fifth blade, a sixth blade, and a seventh blade in order from the foremost blade to the rearmost blade. In other words, the foremost blade of the seven blades is the first blade, and the rearmost blade is the seventh blade.

Referring to FIG. 2, the blade housing 120 includes a blade supporting end 121 to accommodate and support each blade 110. The blade supporting end 121 protrudes upwards and supports one side of the blade 110, e.g., a lower portion of an edge portion 112. A pair of neighboring blade supporting ends 121 is formed with a space therebetween to accommodate a base portion 113 of the blade 110.

The blade housing 120 includes a second front supporter 122 positioned in front of the cutting edge of the first blade. The second front supporter 122 may protrude upwards higher than the cutting edge of the first blade. The top surface of the second front supporter 122 may be positioned above the blade supporting end 121 supporting the first blade.

The second front supporter 122 may protect a user from getting a cut on skin by pressing the skin in front of the first blade during the shaving process, and enhance the hair cutting effect of the first blade by pulling hair right in front of the first blade.

Further, the second front supporter 122 may be formed with a comb for aligning body hair.

The blade housing 120 may include a lubrication band 123 provided behind the rearmost blade (i.e., the seventh blade in FIG. 2). The lubrication band 123 may be at least partially exposed to the top of the blade housing 120. The lubrication band 123 includes a lubricating material, and applies the lubricating material to a skin surface where the blade 110 has passed during the shaving process. The lubricating material may contain an ingredient for protecting skin after shaving and/or an ingredient for smoothing shaving strokes.

The blade housing 120 includes a rear supporter provided in back of the rearmost blade (i.e., the seventh blade in FIG. 2) and touching skin during the shaving process. In the embodiment shown in FIG. 2, the lubrication band 123 may be used as the rear supporter. According to another embodiment, the rear supporter may be provided behind the lubrication band 123 or between the lubrication band 123 and the rearmost blade and protruding upwards higher than the lubrication band 123. Alternatively, the blade housing 120 may include not the lubrication band 123 but the rear supporter provided behind the rearmost blade. For example, the lubrication band 123 may be provided in the guard frame 130. For convenience of description, it will be described below by way of example that the lubrication band 123 functions as the rear supporter, but the disclosure is not limited thereto. The rear supporter and the lubrication band may be provided as separate elements.

Figure 3:
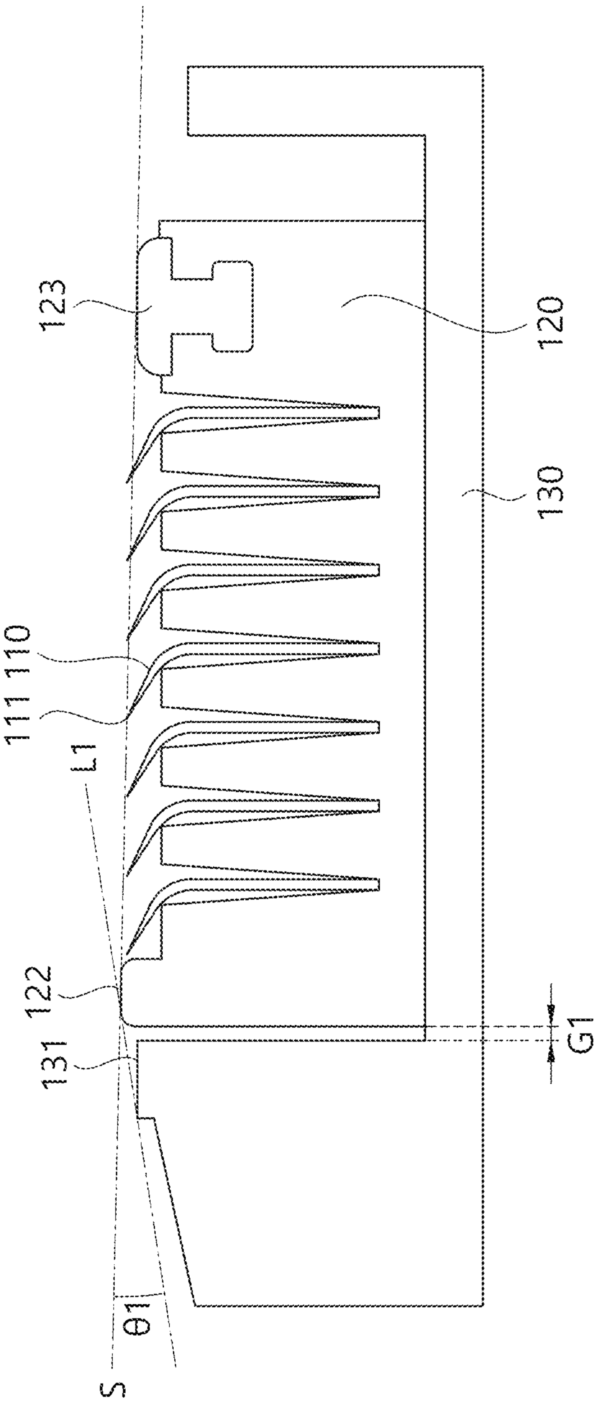
FIG. 3 is a lateral view schematically illustrating that a blade housing of a razor cartridge according to an embodiment of the disclosure is at a foremost position.

The blade housing 120 may define a shaving plane S (see FIG. 3). The shaving plane S approximately corresponds to the surface of skin to be shaved during the shaving process. According to an embodiment, the shaving plane S may be defined as a plane tangent to both the second front supporter 122 and the rear supporter 123.

The guard frame 130 accommodates the blade housing 120 to be movable forwards and backwards. The guard frame 130 allows the blade housing 120 to slide forwards and backwards within a specific distance range while preventing the blade housing 120 from being separated. The direction in which the blade housing 120 slides forwards and backwards may be parallel to the shaving direction.

The blade housing 120 may reciprocate within the guard frame 130 by power transmitted from a separate power source (for example, a motor (not shown) provided in the razor handle 40). For example, the motor provided in the razor handle 40 may generate a rotational force, and at least one of the razor handle 40 and the razor cartridge 10 may include a power conversion mechanism (e.g., a cam, a crank, a link, etc.) that converts the rotational force of the motor into linear reciprocating motion so that the blade housing 120 can have the linear reciprocating motion. Alternatively, the blade housing 120 may be connected to a power source for linear reciprocating motion, and thus have the linear reciprocating motion within the guard frame 130. Alternatively, the blade housing 120 may have the linear reciprocating motion by a mechanical method of using a power conversion mechanism (e.g., a cam, a crank, a link, etc.) that converts a force exerted by a user's operation or shaving stroke into the linear reciprocating motion without using an electrically operating power source.

The guard frame 130 includes a first front supporter 131 positioned in front of the blade housing 120.

Referring to FIG. 2, the topmost portion of the first front supporter 131 may be lower than the topmost portion of the second front supporter 122. A height difference H between the topmost portion of the first front supporter 131 and the topmost portion of the second front supporter 122 may be within a range of 10 μm to 500 μm, 30 μm to 300 μm, or 50 μm to 200 μm.

Because the topmost portion of the second front supporter 122 is positioned higher than the topmost portion of the first front supporter 131, skin right in front of the first blade is stably supported by the second front supporter 122, and thus prevented from being cut by the first blade, thereby being subjected to shaving more safely. Further, because the topmost portion of the second front supporter 122 is positioned higher than the topmost portion of the first front supporter 131, the skin is not inserted between the first front supporter 131 and the second front supporter 122 while the second front supporter 122 is moving forwards, thereby preventing the skin from being pinched between the first front supporter 131 and the second front supporter 122.

During the shaving process, the first front supporter 131 and the second front supporter 122, which is positioned between the blade 110 and the first front supporter 131, may come into contact with skin at the same time. Even though the first front supporter 131, the second front supporter 122, and the rear supporter 123 are not positioned on the same plane, the skin may be curved to have a profile that is in contact with them at three points during the shaving process. For example, the second front supporter 122 provided between the first front supporter 131 and the rear supporter 123 may be positioned higher than the first front supporter 131 and the rear supporter 123, but the skin may have a profile that is in contact with all the first front supporter 131, the second front supporter 122, and the rear supporter 123 during the shaving process.

A guard (not shown) may be formed on the top surface of the first front supporter 131. The guard comes into contact with a user's skin during a shaving process and pulls the skin, thereby improving the shaving effect of the blade 110. To more effectively pull the user's skin, the guard may have an embossed or engraved pattern on an upper surface thereof, and the upper surface of the guard may be made of rubber, silicone, or the like material.

Alternatively, a comb for aligning body hair may be formed on the top of the first front supporter 131.

FIG. 3 is a lateral view schematically illustrating that a blade housing of a razor cartridge according to an embodiment of the disclosure is at a foremost position. When the blade housing 120 is at the foremost position, it means that the blade housing 120 is foremost within the range of linear reciprocating motion.

Referring to FIG. 3, in the state that the blade housing 120 is at the foremost position relative to the guard frame 130, a shaving plane S and a local contact plane L1 intersect each other forming an angle θ1. The local contact plane L1 refers to a plane that is tangent to both the first front supporter 131 and the second front supporter 122.

In the state shown in FIG. 3, the shaving plane S and the local contact plane L1 may intersect at the second front supporter 122 or may intersect adjacent to the second front supporter 122. The local contact plane L1 above the first front supporter 131 is positioned lower than the shaving plane S, and the local contact plane L1 above the rear supporter 123 is positioned higher than the shaving plane S.

As the blade housing 120 moves from a rear side to the foremost side, a gap between the first front supporter 131 and the second front supporter 122 becomes narrower. On the other hand, the height difference between the first front supporter 131 and the second front supporter 122 remains constant, and thus the angle θ1 between the shaving plane S and the local contact plane L1 becomes larger as the blade housing 120 moves from the rear side to the foremost side.

In the state that the blade housing 120 is at the foremost position, the angle θ1 between the shaving plane S and the local contact plane L1 may be within a range from 2 degrees to 15 degrees, from 2.5 degrees to 14.5 degrees, from 2.9 degrees to 10.2 degrees, or 3.6 to 9.5 degrees.

In the razor cartridge 10 according to an embodiment, the blade housing 120 performs shaving while alternating between forward movement and backward movement based on a motor or mechanical force. The shaving is performed by the blade 110 while the blade housing 120 is moving forwards. Because the blade 110 moves in the same direction as the shaving direction while the blade housing 120 is moving forwards, the forward movement of the blade housing 120 may cause strong irritation to skin. Further, such skin irritation is generally caused by the first and second blades which are at forward positions.

In addition, the skin irritation caused by the shaving of the first and second blades is affected by a protrusion value of the first and second blades with respect to the local contact plane L1 rather than a protrusion value of the first and second blades with respect to the shaving plane S. This is because the profile of the skin in an area adjacent to the cutting edges of the first and second blades is similar to the local contact plane L1, and the profile of the skin in an area adjacent to the cutting edges of the blades positioned at the rear side is similar to the shaving plane S.

In the state that the blade housing 120 is at the foremost position, the cutting edges 111 of all the blades 110 may be arranged to have a negative protrusion value with respect to the local contact plane L1. In other words, when the blade housing 120 is foremost, the cutting edges 111 of all the blades 110 may be positioned lower than the local contact plane L1.

In particular, when the blade housing 120 is at the foremost position, the cutting edge of the first blade may have a protrusion value ranging from −0.25 mm to −0.08 mm, from −0.242 mm to −0.081 mm, from −0.225 mm to −0.113 mm, or from −0.209 mm to −0.129 mm with respect to the local contact plane L1.

In the state that the blade housing 120 is at the foremost position, the protrusion value of the cutting edge of the second blade with respect to the local contact plane L1 may be smaller than that of the cutting edge of the first blade. In other words, when the blade housing 120 is foremost, the cutting edge of the second blade may be positioned lower than the cutting edge of the first blade with respect to the local contact plane L1.

In the state that the blade housing 120 is at the foremost position, the cutting edge of the second blade may have a protrusion value ranging from −0.4 mm to −0.15 mm, from −0.393 mm to −0.131 mm, from −0.367 mm to −0.183 mm, or from −0.341 mm to −0.21 mm with respect to the local contact plane L1.

In the state that the blade housing 120 is at the foremost position, the shaving angle of the cutting edge of the first blade with respect to the local contact plane L1 (i.e., an angle between a line bisecting both sides of the blade forming the cutting edge and the local contact plane L1) may be within a range from 17 degrees to 40 degrees, from 17.1 degrees to 39.8 degrees, from 19.9 degrees to 36.9 degrees, or from 22.7 degrees to 34.1 degrees. In the state that the blade housing 120 is at the foremost position, the shaving angle of the cutting edge of the second blade with respect to the local contact plane L1 may also be within a range from 15 degrees to 40 degrees, from 17.1 degrees to 39.8 degrees, from 19.9 degrees to 36.9 degrees, or from 22.7 degrees to 34.1 degrees.

As the blade housing 120 according to an embodiment moves forwards, the shaving angle of the cutting edge of the blade with respect to the local contact plane L1 becomes larger, and the protrusion value of the cutting edge of the blade (in particular, the first blade and the second blade) with respect to the local contact plane L1 becomes smaller, thereby reducing a skin irritation caused by shaving and improving a shaving efficiency.

Meanwhile, the blades in a fore area (for example, the first blade, and the second blade) among the blades 110 may be disposed to have negative protrusion values with respect to the shaving plane S, the blades in a rear area (for example, the sixth blade, and the seventh blade) may be disposed to have positive protrusion values with respect to the shaving plane S, and at least one of the blades in a central area (for example, the third blade, the fourth blade, and the fifth blade) may be disposed to have a protrusion value of '0' with respect to the shaving plane S. Further, the blades disposed in the rear area may have a greater protrusion value with respect to the shaving plane S than the blades disposed in the front area.

For example, with respect to the shaving plane S, the first blade may be disposed so that the cutting edge can have a protrusion value of −0.04 mm, the second blade may be disposed so that the cutting edge can have a protrusion value of −0.03 mm, the third blade may be disposed so that the cutting edge can have a protrusion value of −0.01 mm, the fourth blade may be disposed so that the cutting edge can have a protrusion value of 0.00 mm, the fifth blade may be disposed so that the cutting edge can have a protrusion value of 0.01 mm, the sixth blade may be disposed so that the cutting edge can have a protrusion value of 0.03 mm, and the seventh blade may be disposed so that the cutting edge can have a protrusion value of 0.04 mm.

Meanwhile, in the state that the blade housing 120 is at the foremost position, the first front supporter 131 and the second front supporter 122 may be spaced apart by a specific distance or more. In the state that the blade housing 120 is at the foremost position, a gap G1 between the first front supporter 131 and the second front supporter 122 may be within a range from 0.8 mm to 2.0 mm, from 0.84 mm to 1.97 mm, from 0.98 mm to 1.83 mm, or from 1.13 mm to 1.69 mm.

Figure 4:
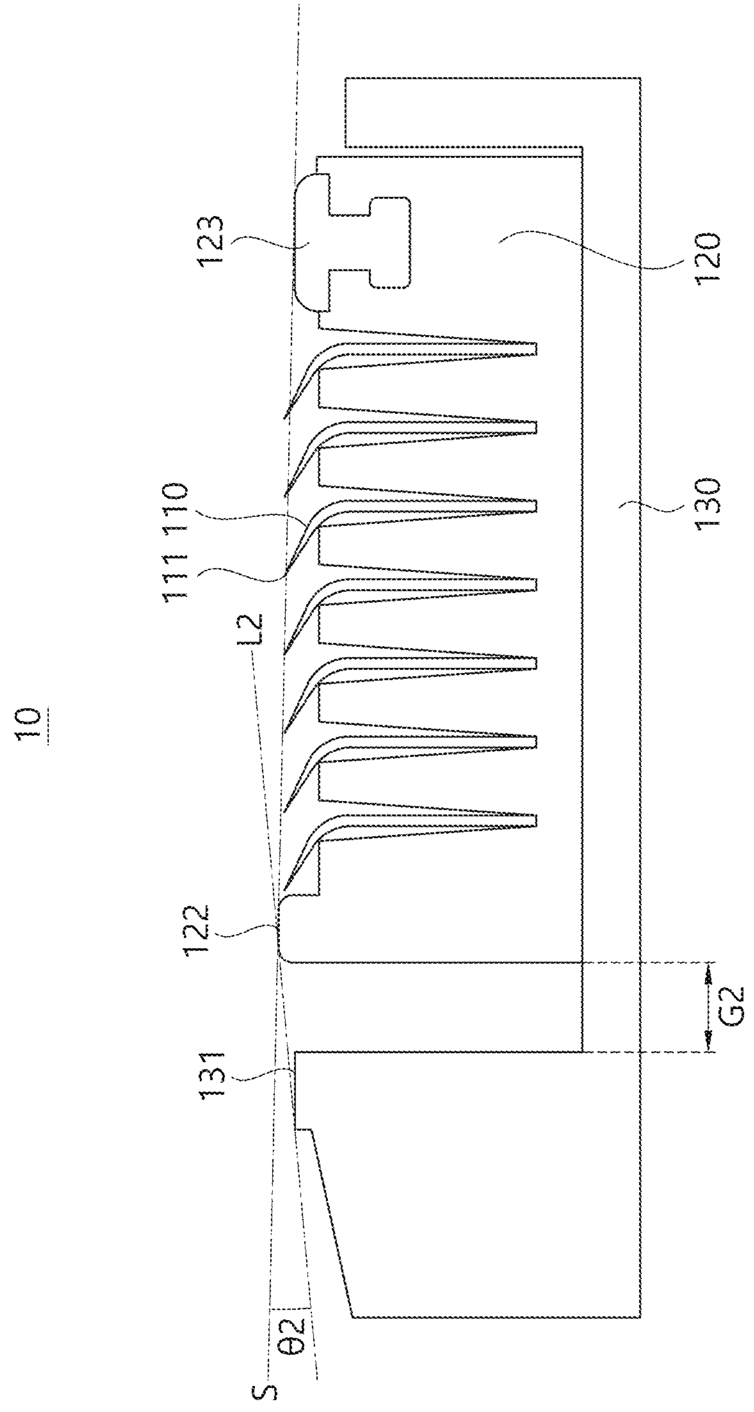
FIG. 4 is a lateral view schematically illustrating that a blade housing of a razor cartridge according to an embodiment of the disclosure is at a rearmost position.

FIG. 4 is a lateral view schematically illustrating that a blade housing of a razor cartridge according to an embodiment of the disclosure is at a rearmost position. When the blade housing 120 is at the rearmost position, it means that the blade housing 120 is rearmost within the range of linear reciprocating motion.

Referring to FIG. 4, in the state that the blade housing 120 is at the rearmost position relative to the guard frame 130, the shaving plane S and the local contact plane L2 intersect each other forming an angle θ2.

In the state shown in FIG. 4, the shaving plane S and the local contact plane L2 may intersect at the second front supporter 122 or may intersect adjacent to the second front supporter 122. The local contact plane L2 above the first front supporter 131 is positioned lower than the shaving plane S, and the local contact plane L2 above the rear supporter 123 is positioned higher than the shaving plane S.

As the blade housing 120 moves from a front side to the rearmost side, a gap between the first front supporter 131 and the second front supporter 122 becomes wider. On the other hand, the height difference between the first front supporter 131 and the second front supporter 122 remains constant, and thus the angle θ2 between the shaving plane S and the local contact plane L2 becomes smaller as the blade housing 120 moves from the front side to the rearmost side.

In the state that the blade housing 120 is at the rearmost position, the angle θ2 between the shaving plane S and the local contact plane L2 may be within a range from 1 degree to 10 degrees, from 1.5 degrees to 8.5 degrees, from 1.7 degrees to 5.9 degrees, or from 2.1 degrees to 3.9 degrees.

Difference between the angle θ1, which is formed between the shaving plane S and the local contact plane L1 in the state that the blade housing 120 is at the foremost position, and the angle θ2, which is formed between the shaving plane S and the local contact plane L2 in the state that the blade housing 120 is at the rearmost position may be within a range from 1.1 degrees to 6.1 degrees, from 1.2 degrees to 4.2 degrees, or from 1.5 degrees to 3.9 degrees.

The blade 110 moves in an opposite direction to the shaving direction while the blade housing 120 moves backwards. Therefore, the shaving efficiency of the blade 110 is lowered while the blade housing 120 moves backwards. However, according to an embodiment, the angle θ2 between the shaving plane S and the local contact plane L2 is gradually decreased when the blade housing 120 moves backwards, and thus the protrusion value of the cutting edge of the blade 110 with respect to the local contact plane L1 is gradually increased, thereby offsetting the decrease in the shaving efficiency.

In the razor cartridge 10 according to an embodiment, the protrusion value of the cutting edge 111 of each blade 110 with respect to the local contact planes L1 and L2 is greater when the blade housing 120 is at the rearmost position than when the blade housing 120 is at the foremost position. In other words, the cutting edge 111 of each blade 110 is positioned closer to the local contact planes L1 and L2 when the blade housing 120 is at the rearmost position than when the blade housing 120 is at the foremost position.

In the state that the blade housing 120 is at the rearmost position, the cutting edges 111 of all the blades 110 may be arranged to have a negative protrusion value with respect to the local contact plane L2. In other words, when the blade housing 120 is rearmost, the cutting edges 111 of all the blades 110 may be positioned lower than the local contact plane L2.

When the blade housing 120 is at the rearmost position, the cutting edge of the first blade may have a protrusion value ranging from −0.17 mm to −0.05 mm, from −0.161 mm to −0.054 mm, from −0.15 mm to −0.75 mm, or from −0.139 mm to −0.86 mm with respect to the local contact plane L2.

Difference between the protrusion value of the cutting edge of the first blade with respect to the local contact plane L1 in the state that the blade housing 120 is at the foremost position and the protrusion value of the cutting edge of the first blade with respect to the local contact plane L2 in the state that the blade housing 120 is at the rearmost position may be within a range from −81 μm to −27 μm, from −76 μm to −38 μm, or from −70 μm to −43 μm.

In the state that the blade housing 120 is at the rearmost position, the protrusion value of the cutting edge of the second blade with respect to the local contact plane L2 may be smaller than that of the cutting edge of the first blade. In other words, when the blade housing 120 is rearmost, the cutting edge of the second blade may be positioned lower than the cutting edge of the first blade with respect to the local contact plane L2.

In the state that the blade housing 120 is at the rearmost position, the cutting edge of the second blade may have a protrusion value ranging from −0.25 mm to −0.08 mm, from −0.242 mm to −0.81 mm, from −0.225 mm to −0.113 mm, or from −0.209 mm to −0.129 mm with respect to the local contact plane L2.

Difference between the protrusion value of the cutting edge of the second blade with respect to the local contact plane L1 in the state that the blade housing 120 is at the foremost position and the protrusion value of the cutting edge of the second blade with respect to the local contact plane L2 in the state that the blade housing 120 is at the rearmost position may be within a range from −152 μm to −51 μm, from −141 μm to −71 μm, or from −131 μm to −81 μm.

In the state that the blade housing 120 is at the rearmost position, the shaving angle of the cutting edge of the first blade with respect to the local contact plane L2 (i.e., an angle between a line bisecting both sides of the blade forming the cutting edge and the local contact plane L2) may be within a range from 15 degrees to 36 degrees, from 15.2 degrees to 35.5 degrees, from 17.8 degrees to 33 degrees, or from 20.3 degrees to 30.5 degrees. In the state that the blade housing 120 is at the rearmost position, the shaving angle of the cutting edge of the second blade with respect to the local contact plane L2 may also be within a range from 15 degrees to 36 degrees, from 15.2 degrees to 35.5 degrees, from 17.8 degrees to 33 degrees, or from 20.3 degrees to 30.5 degrees.

The shaving angle of the cutting edge of the first blade (or other blades) with respect to the local contact plane L2 in the state that the blade housing 120 is at the rearmost position may be smaller than the shaving angle of the cutting edge of the first blade (or other blades) with respect to the local contact plane L1 in the state that the blade housing 120 is at the foremost position.

Difference between the shaving angle of the first blade (or other blades) with respect to the local contact plane L1 in the state that the blade housing 120 is at the foremost position and the shaving angle of the first blade (or other blades) with respect to the local contact plane L2 in the state that the blade housing 120 is at the rearmost position may be within a range from 1.8 degrees to 4.2 degrees, from 2.1 degrees to 3.9 degrees, or from 2.4 degrees to 3.6 degrees.

As the blade housing 120 according to an embodiment moves backwards, the shaving angle of the cutting edge of the blade with respect to the local contact plane L2 becomes smaller, and the protrusion value of the cutting edge of the blade with respect to the local contact plane L2 becomes larger, thereby offsetting the decrease in the shaving efficiency.

Meanwhile, in the state that the blade housing 120 is at the rearmost position, a gap G2 between the first front supporter 131 and the second front supporter 122 may be within a range from 1.3 mm to 3.1 mm, from 1.32 mm to 3.09 mm, or from 1.54 mm to 2.87 mm, or from 1.76 mm to 2.65 mm.

Difference between the gap G1 between the first front supporter 131 and the second front supporter 122 in the state that the blade housing 120 is at the foremost position and the gap G2 between the first front supporter 131 and the second front supporter 122 in the state that the blade housing 120 is at the rearmost position may be within a range from 0.48 mm to 1.12 mm, or 0.56 mm to 1.04 mm, or 0.64 mm to 0.96 mm.

Below, a razor cartridge according to another embodiment will be described. For convenience of description, elements like those of the foregoing embodiment are indicated by like numerals, and repetitive descriptions thereof will be avoided.

Figure 5:
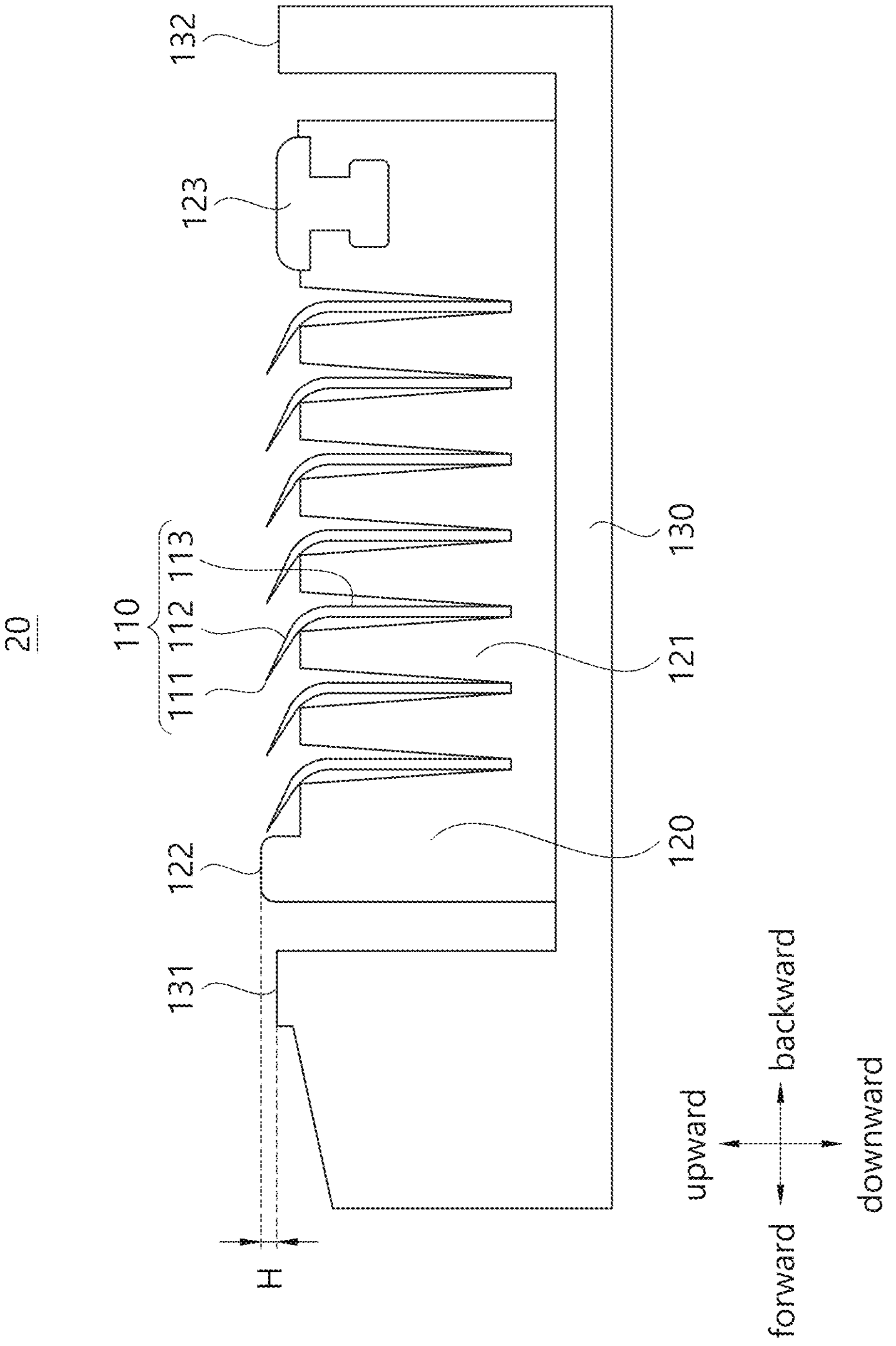
FIG. 5 is a lateral view schematically illustrating a razor cartridge according to another embodiment of the disclosure.
Figure 6:
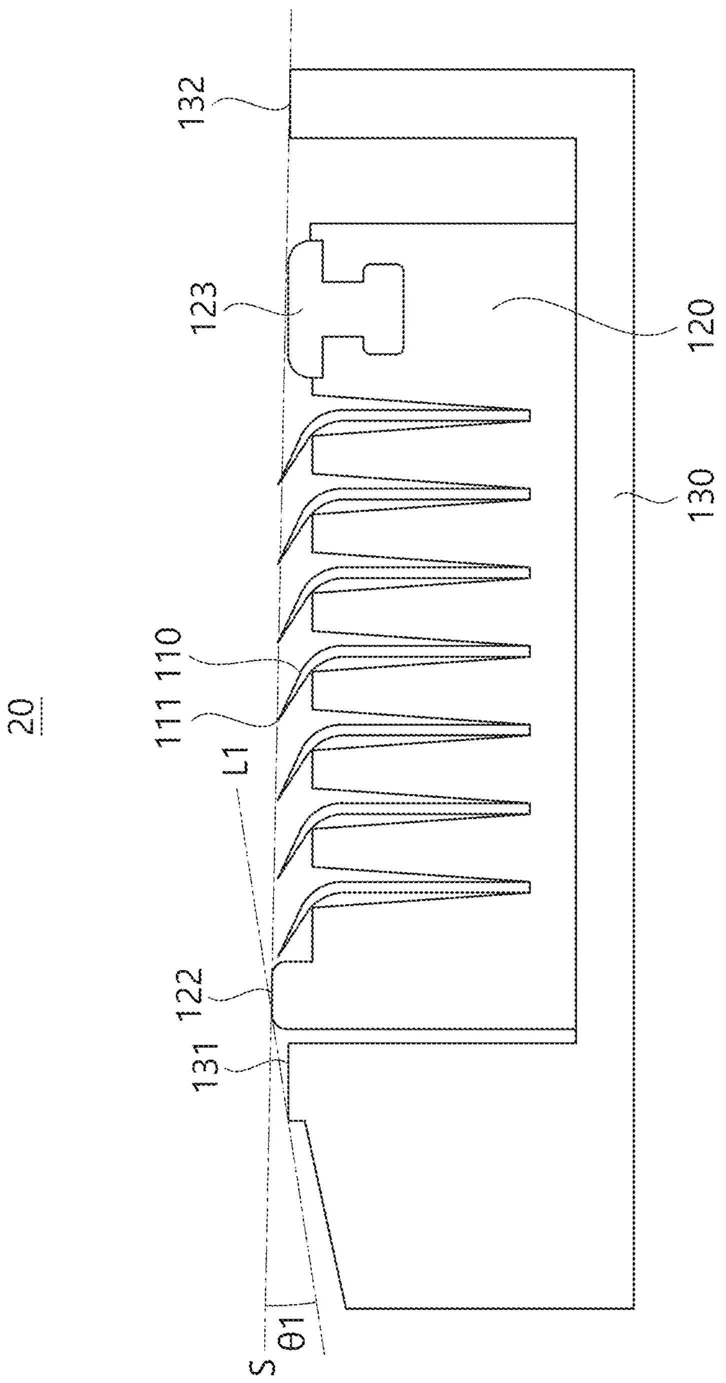
FIG. 6 is a lateral view schematically illustrating that a blade housing of a razor cartridge according to another embodiment of the disclosure is at a foremost position.
Figure 7:
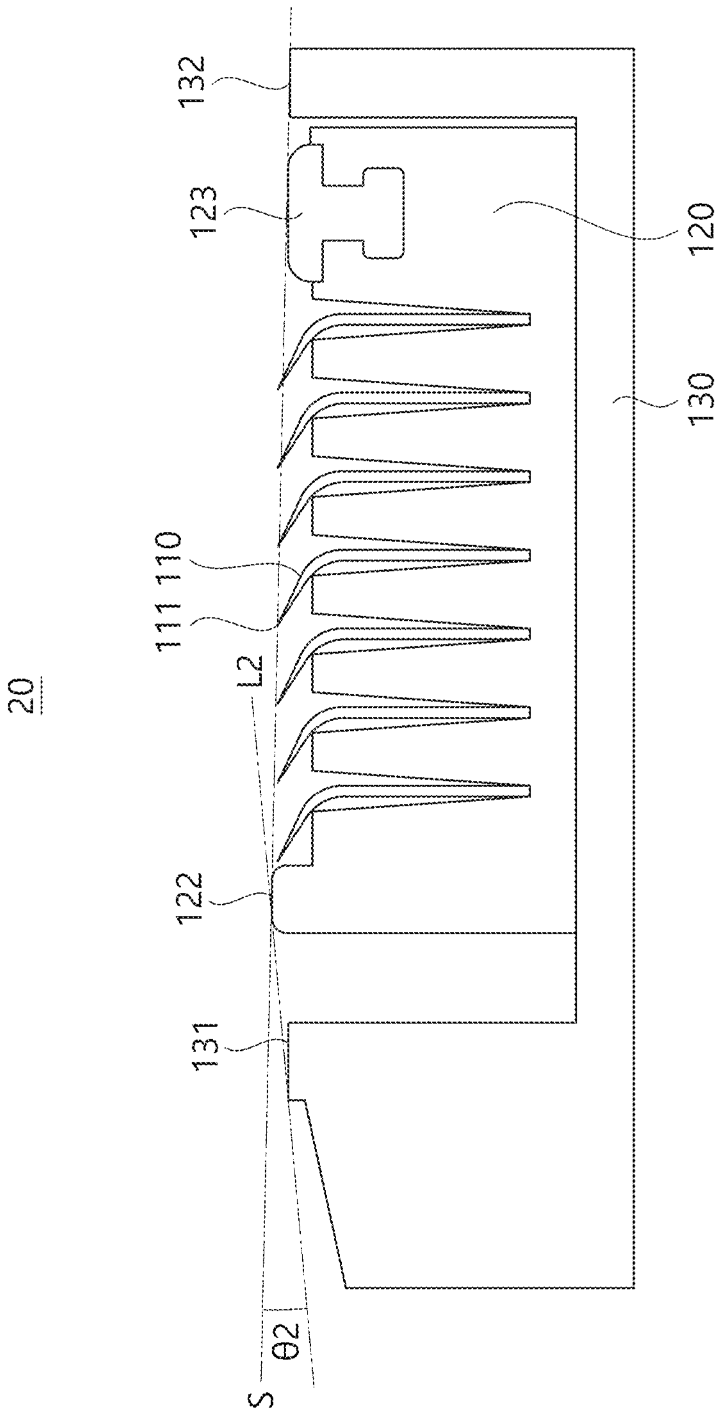
FIG. 7 is a lateral view schematically illustrating that a blade housing of a razor cartridge according to another embodiment of the disclosure is at a rearmost position.

FIG. 5 is a lateral view schematically illustrating a razor cartridge according to another embodiment of the disclosure, FIG. 6 is a lateral view schematically illustrating that a blade housing of a razor cartridge according to another embodiment of the disclosure is at a foremost position, and FIG. 7 is a lateral view schematically illustrating that a blade housing of a razor cartridge according to another embodiment of the disclosure is at a rearmost position.

Referring to FIG. 5, a razor cartridge 20 according to an embodiment of the disclosure includes at least one blade 110, a blade housing 120, and a guard frame 130.

However, unlike the razor cartridge 10 according to the foregoing embodiment, the razor cartridge 20 according to this embodiment includes a rear supporter 132 formed in the guard frame 130.

The guard frame 130 according to this embodiment further includes the rear supporter 132 provided in the rear of the blade housing 120.

The rear supporter 132 may be formed protruding upwards to define the shaving plane S together with the second front supporter 122.

For example, the rear supporter 132 may protrude upwards higher than the blade housing 120. Referring to FIG. 5, when the lubrication band 123 is provided in the blade housing 120, the rear supporter 132 may protrude upwards higher than the lubrication band 123.

Alternatively, although not shown, according to an embodiment, the lubrication band 123 may be provided to be exposed to the top of the rear supporter 132. In this case, the shaving plane S may be defined by the lubrication band 123 of the rear supporter 132 and the second front supporter 122.

In the razor cartridge 20 according to this embodiment, the shaving plane S is defined by the second front supporter 122 formed in the blade housing 120 and the rear supporter 132 formed in the guard frame 130, and thus the shaving plane S is varied depending on the forward or backward movement of the blade housing 120 unlike the razor cartridge 10 according to the foregoing embodiment.

Referring to FIG. 6, as the blade housing 120 moves from the rear side to the foremost side, the shaving plane S is gradually decreased in an angle to a horizontal line as if it rotates counterclockwise about the rear supporter 132. This is because the distance between the second front supporter 122 and the rear supporter 132 gradually becomes longer but the height difference between the second front supporter 122 and the rear supporter 132 remains constant as the blade housing 120 moves forwards.

On the other hand, as the blade housing 120 moves from the rear side to the foremost side, the local contact plane L1 is gradually increased in an angle to the horizontal line as if it rotates counterclockwise about the first front supporter 131. This is because the distance between the first front supporter 131 and the second front supporter 122 gradually becomes shorter but the height difference between the first front supporter 131 and the second front supporter 122 remains constant as the blade housing 120 moves forwards.

As the blade housing 120 moves from the rear side to the foremost side, the angle θ1 between the shaving plane S and the local contact plane L1 becomes larger like that of the razor cartridge 10 according to the foregoing embodiment.

Further, as the blade housing 120 moves from the rear side to the foremost side, the local contact plane L1 rotates counterclockwise about the first front supporter 131. Therefore, the protrusion value of the cutting edge of the blade (in particular, the first blade and the second blade) with respect to the local contact plane L1 becomes smaller, and the shaving angle of the cutting edge 111 of the blade 110 with respect to the local contact plane L1 also becomes larger, thereby reducing a skin irritation caused by shaving and improving a shaving efficiency.

Referring to FIG. 7, as the blade housing 120 moves from the front side to the rearmost side, the shaving plane S is gradually increased in an angle to a horizontal line as if it rotates clockwise about the rear supporter 132. This is because the distance between the second front supporter 122 and the rear supporter 132 gradually becomes shorter but the height difference between the second front supporter 122 and the rear supporter 132 remains constant as the blade housing 120 moves backwards.

On the other hand, as the blade housing 120 moves from the front side to the rearmost side, the local contact plane L2 is gradually decreased in an angle to the horizontal line as if it rotates clockwise about the first front supporter 131. This is because the distance between the first front supporter 131 and the second front supporter 122 gradually becomes longer but the height difference between the first front supporter 131 and the second front supporter 122 remains constant as the blade housing 120 moves backwards.

As the blade housing 120 moves from the front side to the rearmost side, the angle θ2 between the shaving plane S and the local contact plane L2 becomes smaller like that of the razor cartridge 10 according to the foregoing embodiment.

Further, as the blade housing 120 moves from the front side to the rearmost side, the local contact plane L2 rotates clockwise about the first front supporter 131. Therefore, the protrusion value of the cutting edge 111 of the blade 110 with respect to the local contact plane L2 becomes greater, and the shaving angle of the cutting edge 111 of the blade 110 with respect to the local contact plane L2 also becomes smaller, thereby offsetting the decrease in the shaving efficiency.

A person having ordinary knowledge in the art to which the disclosure pertains can understood that the disclosure may be embodied in other specific forms without changing technical spirit or essential features. Accordingly, the embodiments described above are illustrative and not restrictive in all aspects. The scope of the disclosure is defined by the appended claims rather than the foregoing detailed description, and all changes or modifications derived from the meaning and scope of the appended claims and their equivalents are construed as falling within the scope of the disclosure.

What is claimed is:

1. A razor cartridge comprising:

at least one blade having a cutting edge;

a blade housing accommodating the at least one blade in a longitudinal direction; and a guard frame accommodating the blade housing to be movable forwards and backwards, the guard frame comprising a first front supporter provided in front of the blade housing and configured to contact skin during a shaving process, the blade housing comprising a second front supporter provided between the blade and the first front supporter and configured to contact skin during the shaving process, and a topmost portion of the second front supporter being higher than a topmost portion of the first front supporter.

2. The razor cartridge of claim 1, wherein a protrusion value of the cutting edge with respect to a local contact plane connecting the first front supporter and the second front supporter is greater in a state that the blade housing is at a rearmost position relative to the guard frame than in a state that the blade housing is at a foremost position relative to the guard frame.

3. The razor cartridge of claim 2, wherein the cutting edge is positioned lower than the local contact plane in the state that the blade housing is at the foremost position relative to the guard frame.

4. The razor cartridge of claim 3, wherein the protrusion value of the cutting edge with respect to the local contact plane ranges from −0.25 mm to −0.08 mm in the state that the blade housing is at the foremost position relative to the guard frame.

5. The razor cartridge of claim 3, wherein the cutting edge is positioned closer to the local contact plane in the state that the blade housing is at the rearmost position relative to the guard frame than in the state that the blade housing is at the foremost position relative to the guard frame.

6. The razor cartridge of claim 5, wherein the protrusion value of the cutting edge with respect to the local contact plane ranges from −0.17 mm to −0.05 mm in the state that the blade housing is at the rearmost position relative to the guard frame.

7. The razor cartridge of claim 1, wherein a protrusion value of the cutting edge with respect to a local contact plane connecting the first front supporter and the second front supporter is different by 27 μm to 81 μm between a state that the blade housing is at a foremost position relative to the guard frame and a state that the blade housing is at a rearmost position relative to the guard frame.

8. The razor cartridge of claim 7, wherein:

the blade comprises a first blade positioned adjacent to the second front supporter, and a second blade positioned behind the first blade, and the protrusion value of the cutting edge of the first blade with respect to the local contact plane is different by 27 μm to 81 μm and the protrusion value of the cutting edge of the second blade with respect to the local plane is different by 51 μm to 152 μm between the state that the blade housing is at the foremost position relative to the guard frame and the state that the blade housing is at the rearmost position relative to the guard frame.

9. The razor cartridge of claim 1, wherein a shaving angle of the cutting edge with respect to a local contact plane connecting the first front supporter and the second front supporter is smaller in a state that the blade housing is at the rearmost position relative to the guard frame than in a state that the blade housing is at the foremost position relative to the guard frame.

10. The razor cartridge of claim 9, wherein the shaving angle of the cutting edge with respect to the local contact plane ranges from 17 degrees to 40 degrees in the state that the blade housing is at the foremost position relative to the guard frame.

11. The razor cartridge of claim 9, wherein the shaving angle of the cutting edge with respect to the local contact plane ranges from 15 degrees to 36 degrees in the state that the blade housing is at the rearmost position relative to the guard frame.

12. The razor cartridge of claim 1, wherein a shaving angle of the cutting edge with respect to a local contact plane connecting the first front supporter and the second front supporter is different by 1.8 degrees to 4.2 degrees between a state that the blade housing is at the foremost position relative to the guard frame and a state that the blade housing is at the rearmost position relative to the guard frame.

13. The razor cartridge of claim 1, wherein:

the blade comprises a first blade positioned adjacent to the second front supporter, and a second blade positioned behind the first blade, the blade housing or the guard frame further comprises a rear supporter provided in back of the blade and coming into contact with skin during a shaving process, a protrusion value of the cutting edge of the second blade with respect to a shaving plane connecting the second front supporter and the rear supporter is greater than a protrusion value of the cutting edge of the first blade with respect to the shaving plane, and a protrusion value of the cutting edge of the second blade with respect to a local contact plane connecting the first front supporter and the second front supporter is smaller than a protrusion value of the first blade with respect to the local contact plane in a state that the blade housing is at a foremost position relative to the guard frame and in a state that the blade housing is at a rearmost position relative to the guard frame.

14. The razor cartridge of claim 1, wherein:

the blade housing or the guard frame further comprises a rear supporter provided in back of the blade and coming into contact with skin during a shaving process, and a local contact plane connecting the first front supporter and the second front supporter is positioned lower than a shaving plane connecting the second front supporter and the rear supporter above the first front supporter, and higher than the shaving plane above the rear supporter in a state that the blade housing is at the foremost position relative to the guard frame.

15. The razor cartridge of claim 14, wherein an angle between the local contact plane and the shaving plane ranges from 2 degrees to 15 degrees in the state that the blade housing is at the foremost position relative to the guard frame.

16. The razor cartridge of claim 1, wherein:

the blade housing or the guard frame further comprises a rear supporter provided in back of the blade and coming into contact with skin during a shaving process, and a local contact plane connecting the first front supporter and the second front supporter is positioned lower than a shaving plane connecting the second front supporter and the rear supporter above the first front supporter, and higher than the shaving plane above the rear supporter in a state that the blade housing is at the rearmost position relative to the guard frame.

17. The razor cartridge of claim 16, wherein an angle between the local contact plane and the shaving plane ranges from 1 degrees to 10 degrees in the state that the blade housing is at the rearmost position relative to the guard frame.

18. The razor cartridge of claim 1, wherein a height difference between a topmost portion of the first front supporter and a topmost portion of the second front supporter ranges from 10 μm to 500 μm.

19. The razor cartridge of claim 1, wherein a gap between the first front supporter and the second front supporter ranges from 0.8 mm to 2.0 mm in a state that the blade housing is at a foremost position relative to the guard frame.

20. The razor cartridge of claim 1, wherein a gap between the first front supporter and the second front supporter ranges from 1.3 mm to 3.1 mm in a state that the blade housing is at a rearmost position relative to the guard frame.

* * * * *